(12) United States Patent
Meinzinger et al.

(10) Patent No.: US 8,205,743 B2
(45) Date of Patent: Jun. 26, 2012

(54) CARRIER AND METHOD FOR TRANSPORTING A CONTAINER

(75) Inventors: Rupert Meinzinger, Kirchroth (DE); Michael Neubauer, Regensburg (DE)

(73) Assignee: Krones AG, Neutrabling (DE)

( * ) Notice: Subject to any disclaimer, the term of this patent is extended or adjusted under 35 U.S.C. 154(b) by 0 days.

(21) Appl. No.: 12/989,120

(22) PCT Filed: Apr. 21, 2009

(86) PCT No.: PCT/EP2009/002905
§ 371 (c)(1),
(2), (4) Date: Nov. 11, 2010

(87) PCT Pub. No.: WO2009/130004
PCT Pub. Date: Oct. 29, 2009

(65) Prior Publication Data
US 2011/0048904 A1 Mar. 3, 2011

(30) Foreign Application Priority Data
Apr. 22, 2008 (DE) .......................... 10 2008 020 117

(51) Int. Cl.
*B65G 29/00* (2006.01)
(52) U.S. Cl. ............... 198/867.14; 198/867.13
(58) Field of Classification Search ............. 198/867.13, 198/867.14, 803.14, 803.15
See application file for complete search history.

(56) References Cited

U.S. PATENT DOCUMENTS

| 2,463,651 | A | | 3/1949 | Stevens | |
|---|---|---|---|---|---|
| 4,747,482 | A | * | 5/1988 | Sanno | 198/867.13 |
| 4,982,869 | A | | 1/1991 | Robbins, III | |
| 5,224,585 | A | * | 7/1993 | Blanco et al. | 198/867.13 |
| 5,484,052 | A | * | 1/1996 | Pawloski et al. | 198/867.05 |
| 6,293,387 | B1 | | 9/2001 | Forster | |
| 6,715,978 | B2 | * | 4/2004 | Lin et al. | 414/416.05 |

FOREIGN PATENT DOCUMENTS

| DE | 4210387 A1 | 10/1993 |
|---|---|---|
| DE | 69228884 T2 | 9/1999 |
| DE | 69602976 T2 | 10/1999 |
| EP | 0222175 A1 | 5/1987 |
| EP | 0600130 A2 | 6/1994 |
| EP | 0680925 A2 | 11/1995 |
| EP | 0727367 A1 | 8/1996 |
| GB | 2264486 A | 9/1993 |
| WO | WO-02100745 A1 | 12/2002 |
| WO | WO-03091109 A1 | 11/2003 |
| WO | WO-2005110851 A1 | 11/2005 |

* cited by examiner

*Primary Examiner* — James R Bidwell
(74) *Attorney, Agent, or Firm* — Marshall, Gerstein & Borun LLP

(57) ABSTRACT

A carrier for transporting at least one container along a conveying path, has a base that can be placed on a conveyor surface of the conveying path, and at least one retaining plate for retaining the container at least during transport. The container has a lower region and a head region on the top, and the retaining plate is configured and disposed in the carrier for engaging at the head region of the suspended container. The container is inserted into the carrier such that it is supported at the head region of the carrier and is retained during transport in a suspended manner.

24 Claims, 4 Drawing Sheets

CARRIER AND METHOD FOR TRANSPORTING A CONTAINER

CROSS-REFERENCE TO RELATED APPLICATION

The present application claims the benefit of priority of International Patent Application No. PCT/EP2009/002905, filed Apr. 21, 2008, which application claims priority of German Application No. 102008020117.0, filed Apr. 22, 2008. The entire text of the priority application is incorporated herein by reference in its entirety.

FIELD OF THE DISCLOSURE

The present disclosure relates to a carrier as well as to a method for transporting containers, such as used in beverage bottling operations.

BACKGROUND

In container treatment apparatuses, e.g. in connection with bottle filling devices, the so-called neck handling is normally used, which means that each bottle is held by a conveyor element, e.g. a clamp gripper, on an annular flange formed on the bottle neck, while it is being conveyed through or to stations. In addition, the so-called base handling is common practice, which means that each bottle is conveyed in an upright position, e.g. on a conveyor belt, and may even be held at the bottom.

In the case of containers that are not capable of standing upright, it is known to convey each container with a so-called carrier which comprises a base standing on the conveyor surface of a conveyor path and which is conveyed in a free-standing condition (EP-A-0 222 175). The carrier is configured as a kind of adapter, which is adapted to the conveyor path on the outer side thereof and to the greatest possible variety of different containers on the inner side thereof. The known carrier is open at the top so that the container can be inserted from above and removed upwards, and it is provided with retaining means on the base which engage at a downward area of the container and support the latter in the carrier during transport. The sides of the base constituting the front and rear sides when seen in the direction of transport have similar convex curvatures so that, when the carriers are transported one behind the other, they will butt against one another. The insertion and the removal of each container necessitates complicated lowering and lifting movements with possibly exact positioning on the sides, which will require additional space and an additional investment in control technology. Furthermore, the carrier is only adapted to a limited number of differently configured containers, so that in a container treatment apparatus in which the containers to be selectively conveyed are very different, it is necessary to use a corresponding number of different carriers or at least carrier inserts, and so that, when a changeover to other containers takes place, time-consuming retrofitting operations will also be required for the carriers. In view of the fact that a large number of carriers is often required on the conveyor path, these changeover times add up to undesirably long downtimes of the container treatment apparatus. When neck handling or some other kind of handling with only horizontal relative movements between the containers and the conveying elements moving the containers within the stations is carried out in the stations interconnected by the conveyor path, communication between the stations and the conveyor path is difficult, since the known carrier additionally necessitates, for loading and unloading, lifting and lowering movements for which control units may perhaps not be available in the stations themselves. Communication then requires a high investment in construction and control technology because of the carriers.

SUMMARY OF THE DISCLOSURE

It is one aspect of the present disclosure to provide a carrier of the type referred to at the beginning as well as a method for transporting containers with such carriers, which allow a large number of containers and also containers with highly different structural designs to be selectively handled in an ergonomically advantageous manner and without any changeover operations that would be worth mentioning.

The carrier allows so to speak a neck handling of the container without having the container directly acted upon by conveying elements of the conveyor path. In view of the fact that the container can be inserted in and removed from the carrier with substantially exclusively horizontal movements, the conveyor path can, thanks to the carriers, be easily incorporated into a conventional neck handling system with transport stars. The carrier allows easy handling of containers that are capable of standing upright as well as of containers that are not able to do so and it allows the transport of containers that differ from one another to a high extent, without necessitating any changeover operations that would be worth mentioning. The containers can differ not only with respect to volume, size, height and outer contour but also with respect to their dimensions in the head region. The carrier is expediently conveyed, as long as it is empty as well as after insertion of the container, in a free-standing condition with the aid of a simple conveyor or a conveyor belt up to or through treatment stations and/or machines having e.g. separate conveying or manipulating systems for the containers themselves. The carrier and the method are particularly suitable for e.g. beverage containers which, following a new trend, are directly inserted in a beverage dispensing system or connected thereto, e.g. to a beer tap, so as to avoid, among other drawbacks, the drawback of a frequently necessary cleaning of long, permanently installed feed lines leading to a separately stored container. The container may be equipped with a connection hose which is removed together with the container when the container is empty. The holding capacity of such containers, which are blown e.g. from a plastic material, is many times that of conventional beverage bottles, but the containers are normally not capable of standing upright and, depending on the respective types of beverages and/or beverage dispensing systems, they may substantially differ from one another.

Since the container is only supported in the head region, and since the head regions of even strongly different containers are normally less different than e.g. the lower parts or the maximum diameter of the containers, the carrier can, thanks to engagement at the head region, be used for a very large number of different container embodiments. The head region of each container is held on substantially the same level, irrespectively of how large, strong or long the container is. Especially in the case of the above-mentioned containers following the new trend, which are pro-vided with comparatively large and stable closure caps when they have been filled, it will be advisable to make the retaining means engage below the closure cap or around the closure cap. The container may, however, also be held on a collar-like flange formed on the container neck, or, provided that the container has a suitable shape in the head region, it may even be held below the neck. The filled container's own weight, which may be considerable, will have an additional stabilizing effect on the container in the retaining means of the carrier, so that the container can e.g. easily be conveyed on a conveyor belt from a filling apparatus along the conveyor path to a packaging station. In the course of this process, the carriers can be in direct contact with one another and possibly stabilize one another, since the fact that each of the respective containers is supported in the head region stabilizes said containers such that containers in adjoining carriers will not contact one another.

According to a particularly expedient embodiment, the container can be inserted in the carrier such that it is suspended in the retaining means, i.e. the lower area of the container has no contact with the carrier. Preferably, the container is inserted in and removed from the retaining means by a respective, e.g. exclusively horizontal movement oriented at least approximately parallel to the conveyor surface. This has the effect that space-consuming lifting and lowering movements which are difficult to control can be dispensed with, so that the conveyor path can be simple and can easily be used in connection with apparatuses having conveyor systems with horizontal movement control.

According to an expedient embodiment, the retaining means is arranged above the base in spaced relationship therewith on at least one support extending upwards from the base. The distance is chosen large enough for allowing even the highest containers to be transported without any difficulty. For stabilizing the retaining means relative to the base, preferably two spaced supports or support pairs are provided on the base. The supports are positioned e.g. on a side of the base which, during transport on the conveyor path, faces away from the container treatment devices, e.g. a filling device and/or a packaging device. In the case of a conveyor path having associated therewith a filling device and a packaging device on the outer side thereof, the support or the supports should be positioned on the side of the base facing the inner side of the conveyor path during transport.

It will be expedient when the retaining means is at least one, preferably approximately semicircular recess, which is open on an insertion side and which is provided in a retaining plate mounted on the support. In the case of another embodiment, the retaining means is at least one fork mounted on the support and/or a retaining plate. According to a further embodiment, the retaining means is at least one gripping clamp mounted on the support and/or a retaining plate. The retaining means can be brought into positive and/or frictional engagement with the head region of the container. For supporting and holding the container, also the container's own weight can be utilized. When a gripping clamp is provided, said gripping clamp may have a variable opening width and/or gripping areas of different widths, so that different diameters in the head regions of different containers can be dealt with. The fork can have legs that diverge to the insertion side.

It will be expedient when the base is provided with a base plate, which, for placing the base plate on the conveyor surface of the conveyor path, is configured in at least one, preferably only one predetermined orientation with respect to either the inner and outer sides of the conveyor path and/or the conveying direction thereof. The base plate has the function of adapting the carrier to the conveyor path, i.e. the conveyor surface thereof. It will be expedient when said base plate can be placed on the conveyor surface in only one orientation, and when it can be configured such that optimum stability and an optimum resistance to tilting are obtained.

According to an expedient embodiment, the base plate comprises, when seen in the conveying direction, trailing and leading contour portions which are adapted to be brought into positive engagement with complementary contour portions of base plates of carriers positioned in a free-standing manner on the conveyor surface directly behind or in front of said first-mentioned base plate, said positive engagement being effective horizontally and transversely to the conveying direction. In this way, carriers which are conveyed one behind the other will mutually stabilize and guide one another.

In accordance with an expedient embodiment, the contour portions are even arcuate, preferably circular arc shaped, and alternately concave and convex, on that, in spite of the mutual support through positive engagement, they will be able to move relative to one another in curves of the conveyor path and so that the mutual stabilization of the carriers through their base plates will be maintained also in curves.

In the case of an expedient embodiment, the base and/or the retaining plate have/has arranged thereon at least one positioning element. Said positioning element can preferably be positioned such that it is approximately horizontally or vertically oriented relative to a centre axis of the container suspended in the carrier and/or of the retaining means. This positioning element or a plurality of positioning elements can then be used for precisely positioning the carrier in the respective container treatment station (e.g. the filling device or the packaging device), so as to guarantee correct insertion and removal of the container due to the cooperation of the positioning element and the respective station, i.e. the container conveying or manipulating system thereof.

An expedient embodiment is so conceived that, between the base and the retaining plate, the carrier is open at least on a container insertion and removal side, which will facilitate not only the insertion and the removal of the container but also its movement through or past the respective station, when components of the stations required for loading and unloading the carrier may there perhaps enter the "air space" above the conveyor path.

When the container is inserted in the carrier, the centre of gravity of the container should be positioned below the point of engagement between the head region and the retaining means.

According to an expedient method variant, the container is inserted in and removed from the carrier with an e.g. horizontal movement that is substantially parallel to the conveyor surface, in a direction approximately transversely to the conveying direction, so that in the area where the conveyor path communicates with a station it will not be necessary to use complicated control systems for lifting or lowering movements, the least possible amount of space will be required at the loading and unloading site in the vertical direction, and horizontal movements which may perhaps be caused in the station anyhow can be utilized for loading and unloading the carriers.

BRIEF DESCRIPTION OF THE DRAWINGS

Embodiments of the subject matter of the disclosure are explained on the basis of the drawings, in which.

DETAILED DESCRIPTION OF THE PREFERRED EMBODIMENT

Figure 1:
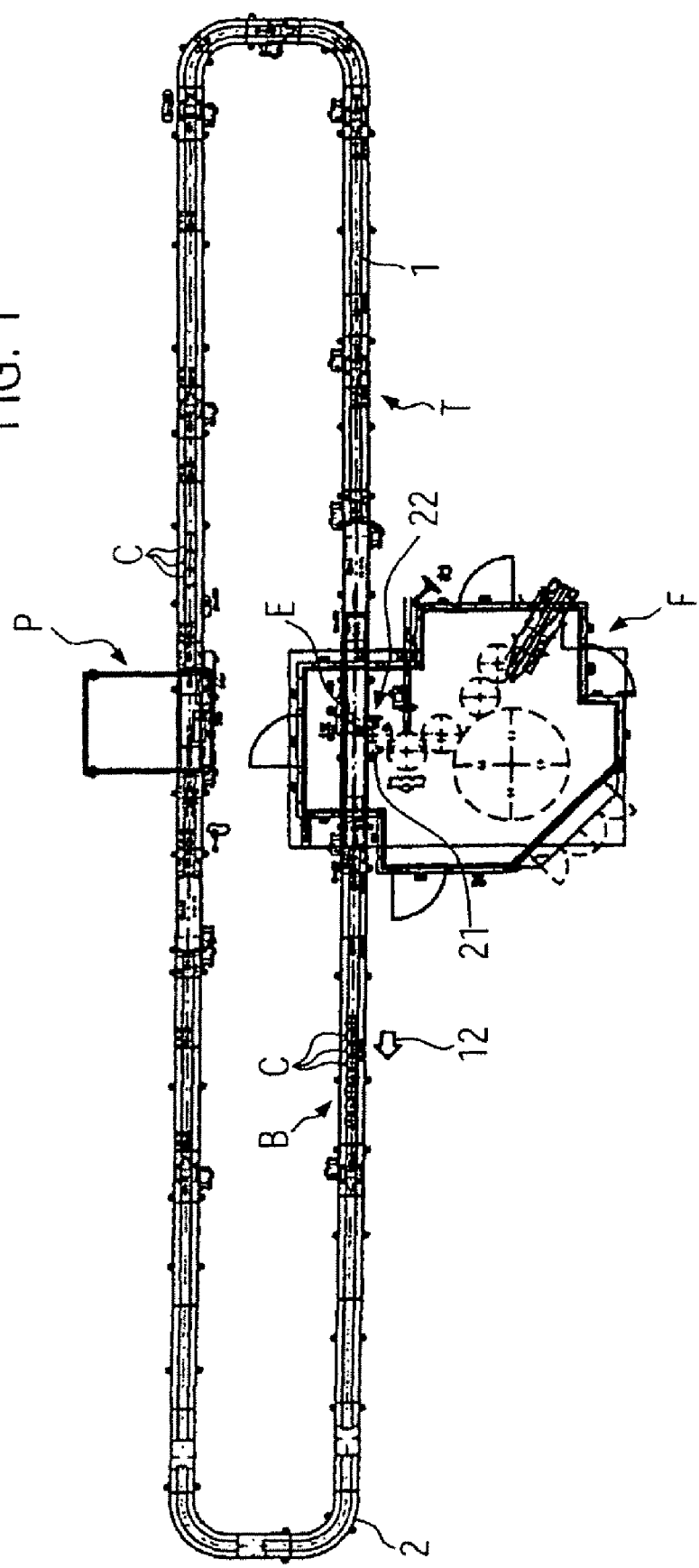
FIG. 1 shows a top view of a conveyor path in a container treatment apparatus comprising two stations.

FIG. 1 represents a schematic top view of a conveyor path T, which is implemented as an endless conveyor path in this embodiment and which comprises an upper conveyor surface 1 for transporting individual containers B, e.g. bottles, supported in a suspended manner in carriers C for the purpose of transport. In this embodiment, the carriers C are conveyed, with or without a container B, in direct contact with one another in a conveying direction 12 along the conveyor path T. The conveyor path T communicates with e.g. two container treatment stations F, P (e.g. a filling device and a packaging device) such that these stations are associated with the outer side of the conveyor path T and the conveyor path T extends partially through said stations. Said stations F, P contain e.g. neck handling conveyor systems which transfer each container B to a respective carrier C on the conveyor path T with a substantially horizontal insertion movement E and remove the respective container B from the carrier C with a substantially horizontal removal movement. However, conveyor systems included in the units F, P may, however, also be of a different type of construction. The communication area must have provided therein a motion control, which must be capable of generating at least substantially horizontal insertion and removal movements of the containers B relative to the carriers C.

The conveyor surface 1 of the conveyor path T may by implemented e.g. as a shingle conveyor or as an articulated conveyor belt, which moves also in curves or bends 2 and which is e.g. pro-vided with guide rails on one or on both sides, at least in certain areas thereof.

From station F (e.g. a filling station), the carriers C are charged with the previously filled and closed containers B. The carriers C charged with the containers B are then transported along the conveyor path T, also through the curves or bends 2, to station P (e.g. a packaging device), where the containers B are removed from the carriers C before the empty carriers C are, again along the conveyor path T, conveyed back to station F in the conveying direction 12.

Figure 2:
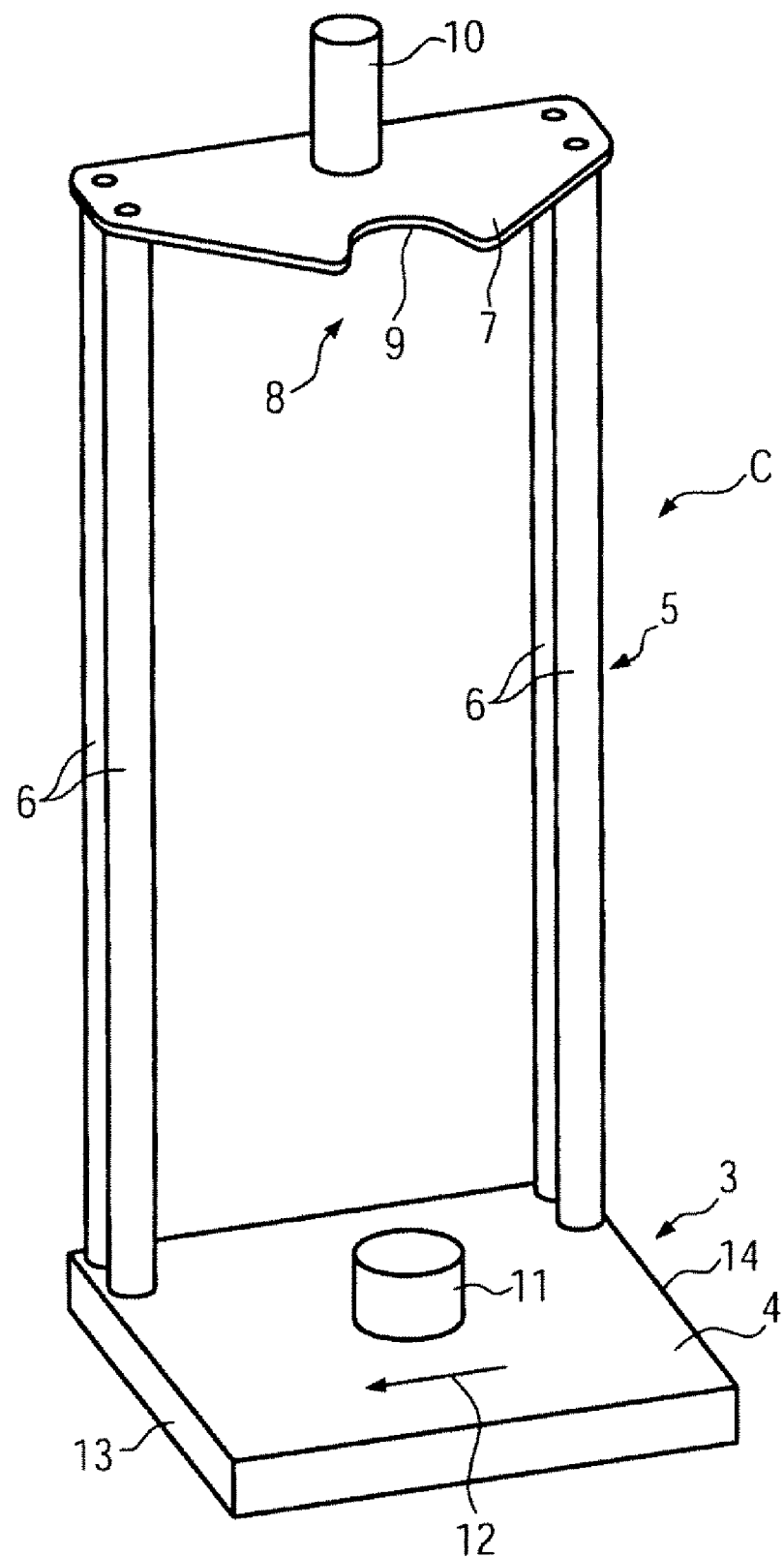
FIG. 2 shows a perspective view of a carrier for transporting a container along a conveyor path, e.g. the conveyor path of FIG. 1.

FIG. 2 illustrates an embodiment of a carrier C comprising a base 3 (e.g. a base plate 4), at least one support 5 extending upwards from the base 3, and retaining means 8 located on the upper end of the support 5 and vertically spaced from the base 3.

The base 3 is a quadrangular or square base plate 4 with straight contour portions 13, 14 which are located at the front and at the rear in the conveying direction 12 and which extend approximately transversely to the conveyor path T during transport (FIG. 1). In the embodiment shown, the support 5 is defined by two spaced-apart support pairs 6 (e.g. pipe sections) carrying as retaining means 8 a retaining plate 7 with a substantially semicircular recess 9 that is open on one side. The base 3 has arranged thereon a positioning element 11. Also the retaining plate 7 may carry a positioning element 10, if necessary. The positioning elements 11, 10 may e.g. be cylindrical pins or pipe sections, the positioning element 11 being, by way of example, oriented vertically to the centre of the recess 9, whereas the positioning element 10 is oriented horizontally to the centre of the recess 9.

The positioning element 11 serves e.g. to cooperate with a transfer star 21 in station F, said transfer star 21 having on its contour peripheral recesses 22, which are arranged e.g. with a spacing corresponding to that of the passing carriers C for cooperation with the positioning elements 11, so as to achieve during the charging of each carrier C an exact alignment between e.g. the transfer star 21 and the carrier C. The positioning element 10 on the retaining plate 7 may be used, alternatively, or additively, for the same purpose or for temporarily supporting the carrier C against tilting, or it may e.g. also be used for positioning and/or supporting and guiding the carrier C when said carrier C is unloaded in station P.

In the carrier C in FIG. 2, the support 5, i.e. the support pairs 6 are arranged close to a side of the base plate 4 facing the inner side of the conveyor path T when the carrier C stands free on the conveyor surface 1, so that the carrier C is fully open on its loading and unloading side which faces the station F, P and the outer side of the conveyor path T, respectively.

Figure 3:
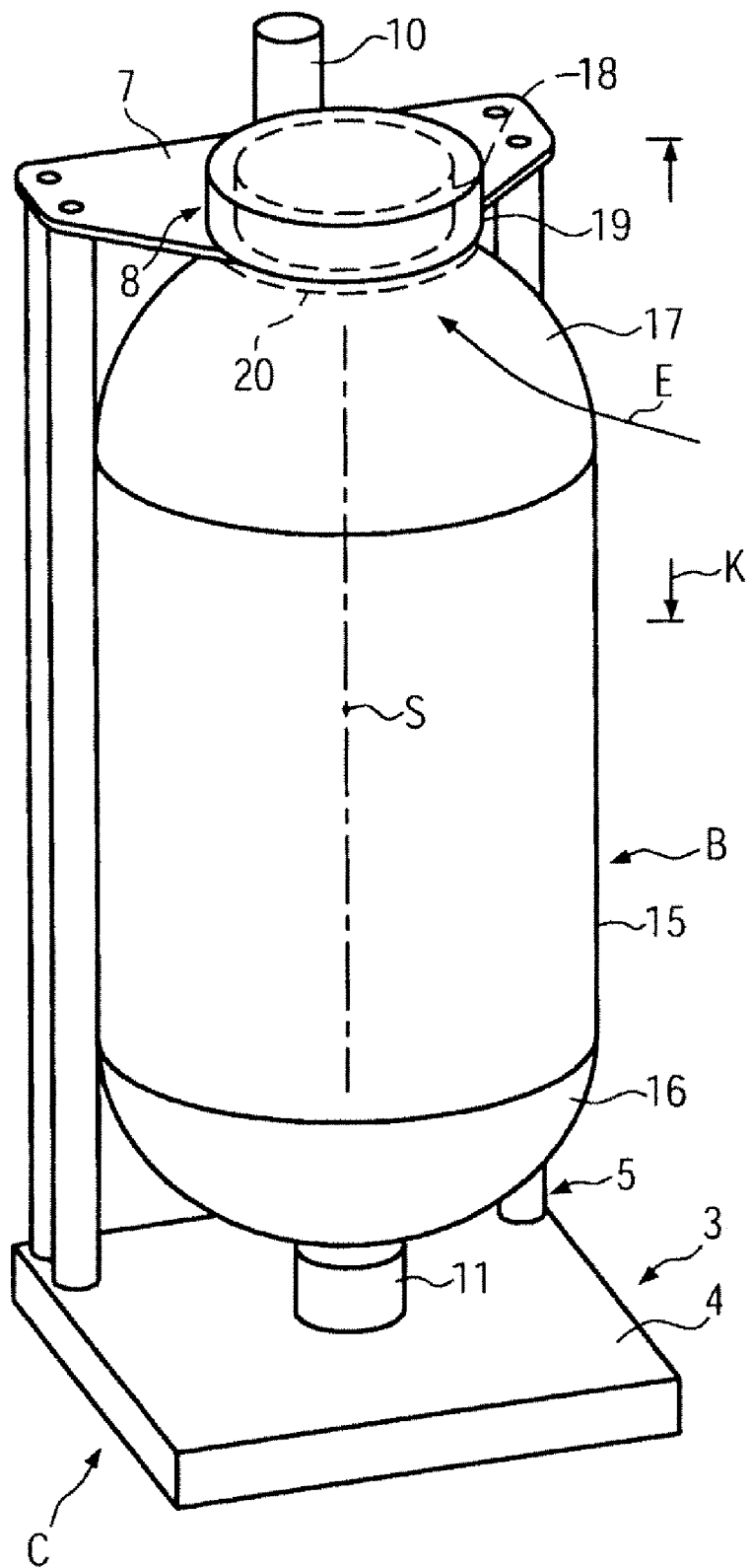
FIG. 3 shows a perspective view of the carrier of FIG. 2 having a container inserted therein.

FIG. 3 shows a transport unit consisting of a carrier C and a container B, e.g. a bottle, which is retained in a suspended, supported manner in said carrier C.

The container B has a head region K that is located on the top during transport in the carrier C. In the head region K of this container B there is a neck area 17 whose diameter decreases up-wards, a container neck 18 having a diameter that is smaller than the maximum diameter of the neck area 17, and a closure cap 19 put over the container neck 18 and secured in position thereon. Alternatively, or additively, it would also be possible to provide on the container B a retaining collar 20 encompassing the container neck 18. The neck area 17 is followed in downward direction by a substantially cylindrical portion 15, which defines the maximum diameter of the container B, and a lower, cambered bottom 16. The centre of gravity S of the container B lies, in the filled condition of the container B, e.g. slightly below the middle of the height of the container. The container embodiment shown is only a non-limiting example of a great variety of different containers which selectively match the retaining means 8 in the carrier C.

The container B is inserted substantially horizontally in the recess 9 of the retaining plate 7 in the direction of insertion E (FIG. 1) and it is supported either via the lower side of the closure cap 19 or the retaining collar 20, the centre of gravity S of the container B lying a considerable distance below the point of engagement between the retaining means 8 and the head region K of the container B. It follows that the inserted container B is retained in a suspended, supported manner in said carrier C, without contacting e.g. the positioning element 11 or the base 3 during transport. It is imaginable to make the container B contact the at least one support 5 so as to support the container additionally.

Figure 4:
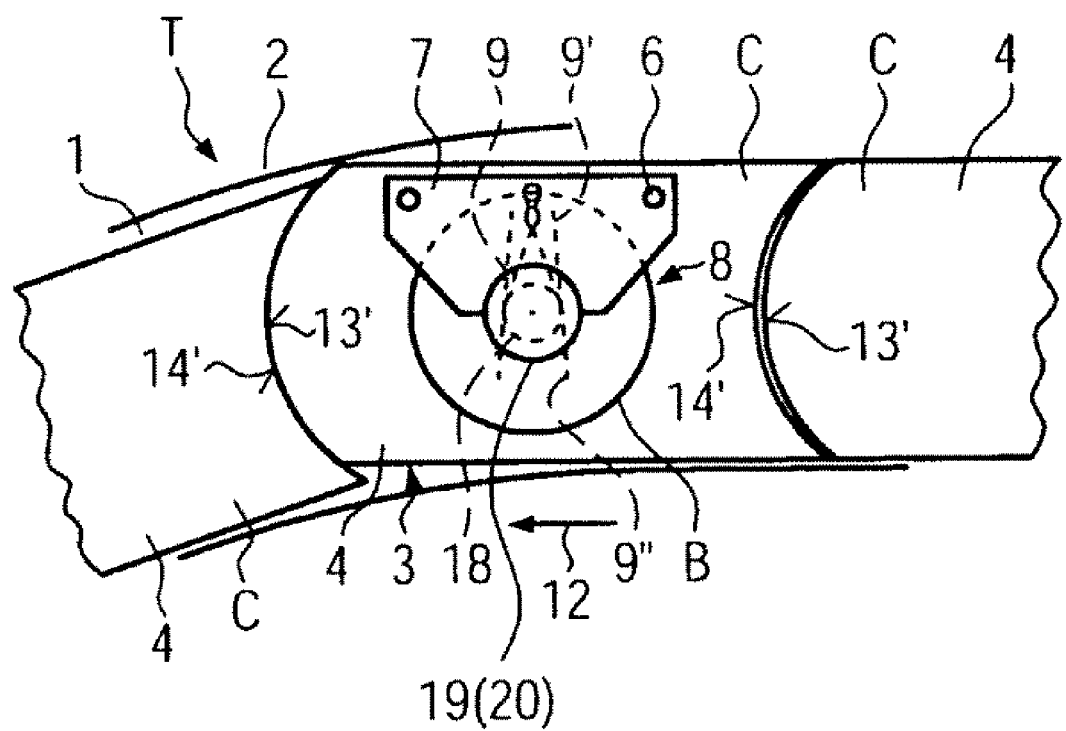
FIG. 4 shows a schematic top view of a plurality of adjoining carriers on the conveyor path, said carriers travelling through a curve.

FIG. 4 illustrates in a top view a plurality of carriers C conveyed in direct contact with one another along the conveyor path, the inserted container B being indicated in the central carrier C. The base plates 4 of the carriers C have here trailing and leading contour portions 13', 14' in the conveying direction 12, which are adapted to be brought into positive engagement with one another in pairs transversely the conveying direction 12 so that the carriers C will mutually support one another. By means of curved portions or two alternately concave and convex circular-arc portions formed on each base plate 4, this engagement can be configured such that the carriers C can also travel through the bends or curves 2 of the conveyor path T; in so doing, the curved contour portions 13', 14' will rotated relative to one another without releasing the positive engagement.

Instead of the retaining means 8 with the recess 9, either a fork 9' diverging towards the insertion side could be mounted on the support 5, 6 and/or on the retaining plate 7, or a clamp gripper 9" could be mounted on the support 5 and/or the retaining plate 7, said clamp gripper 9" being acted upon e.g. by a spring towards a gripping position and being spread apart during the horizontal insertion movement E by the head region K of the container B, whereupon it will clamp said container B and hold it in a freely suspended manner.

The retaining means 8, i.e. the recess 9 or the fork 9' or the clamp gripper 9", are configured such that they selectively match different diameters and/or shapes in head regions K of differently configured containers B. It will be expedient to choose the height of the retaining means 8 above the base 3 such that also the highest containers B occurring can be transported easily. Lower containers B are spaced at a larger distance from the base 3 during transport. Irrespectively of their height, their volume or their shape, all containers B conveyed are always positioned in the carrier C with the same vertical distance between the head region K and the base 3 of the carrier C, a circumstance that can be expedient for cooperating conveying or manipulating systems of the stations P, F.

It is not absolutely necessary to load each container B into the carrier C such that its mouth faces upwards, but it would definitely be possible to load the container B such that its mouth faces downwards.

The carrier C may be implemented such that it can be used for transporting at least two containers B at the same time. The carriers C may be conveyed on the conveyor path T with spaces between them. The carriers C are preferably conveyed in a free-standing condition. They may, however, also be mounted on a conveyor path in an upright suspended condition, e.g. by fixing the supports 6 to a conveyor chain. In this case, the base 3 may possibly be omitted.

The invention claimed is:

1. A carrier for transporting at least one container along a conveyor path, extending up to through at least one container treatment station located at a side of the conveyor path and communicating with the conveyor path in a communication area and having a conveyor or manipulating system for inserting or removing a container into or from the carrier, the carrier comprising a base for placing the carrier on a conveyor surface of the conveyor path, at least one retaining means which is adapted to be used for engaging at the container and for retaining the container at least during transport with the carrier the container having a lower region and an upper head region during transport, the retaining means being configured for engaging at the head region of the container and arranged such that the container, when transported, is supported in the retaining means at the head region and suspended downwards from the retaining means, the base being provided with a base plate, wherein one of the base, the retaining means, or a combination thereof has arranged thereon at least one carrier positioning element having a first attachment end attached to and projecting from the one of the base, the retaining means, or combination thereof, and a second free end not attached to the base or the retaining means, the carrier positioning element for aligning the carrier on the conveyor path and/or for supporting the carrier on the conveyor path for co-operation with the container conveying or manipulating system of the container treatment station such that the carrier will not tilt while a container is inserted into or removed from the carrier.

2. A carrier according to claim 1, wherein the positioning element is arranged to be approximately horizontally or vertically oriented relative to a center axis of the head region of the container suspended in the carrier and/or of the retaining means.

3. A carrier according to claim 1, wherein the positioning element is a pin or a pipe section.

4. A carrier according to claim 1, wherein the retaining means is at least one approximately semicircular recess which is open on an insertion side of the carrier and which is provided in a retaining plate mounted on the support, or at least one fork mounted on the support and/or the retaining plate, or at least one gripping clamp mounted on the support and/or the retaining plate, and wherein the positioning element is aligned vertically or horizontally with a centre of the recess, the fork or the gripping clamp.

5. A carrier according to claim 4, wherein the gripping clamp has a variable opening width or gripping areas of different widths.

6. A carrier according to claim 1, wherein when seen in the conveying direction, the base plate comprises trailing and leading, identical but inverse contour portions, and that, for placing the base plate on the conveyor surface in at least one predetermined orientation with respect to either the inner and outer sides of the conveyor path and/or the conveying direction, the contour portions are adapted to be brought into positive engagement with complementary contour portions of base plates of carriers present on the conveyor surface directly behind or in front of the first-mentioned base plate, the positive engagement being effective transversely to the conveying direction.

7. A carrier according to claim 6, wherein for the purpose of allowing the carriers to rotate relative to one another in curves of the conveyor path, the contour portions on the base plate are arcuate and alternately concave and convex.

8. A carrier according to claim 7, wherein the contour portions on the base plate are circular arc shaped.

9. A carrier according to claim 1, wherein the container is a bottle.

10. A carrier according to claim 1, wherein the conveyor path is a conveyor belt.

11. A carrier for transporting at least one container along a conveyor path, comprising a base for placing the carrier on a conveyor surface of the conveyor path, at least one retaining means which is adapted to be used for engaging at the container and for retaining the container at least during transport with the carrier the container having a lower region and an upper head region during transport, the retaining means being configured for engaging at the head region of the container and arranged such that the container, when transported, is supported in the retaining means at the head region and suspended downwards from the retaining means, the base being provided with a base plate, and one of the base, the retaining means, or a combination thereof has arranged thereon at least one positioning element projecting from the one of the base, the retaining means, or combination thereof for aligning the carrier on the conveyor path and/or for supporting the carrier such that the carrier will not tilt, wherein when seen in the conveying direction, the base plate comprises trailing and leading, identical but inverse contour portions, and that, for placing the base plate on the conveyor surface in at least one predetermined orientation with respect to either the inner and outer sides of the conveyor path and/or the conveying direction, the contour portions are adapted to be brought into positive engagement with complementary contour portions of base plates of carriers present on the conveyor surface directly behind or in front of the first-mentioned base plate, the positive engagement being effective transversely to the conveying direction.

12. A carrier for transporting at least one container along a conveyor path, comprising a base for placing the carrier on a conveyor surface of the conveyor path, at least one retaining means which is adapted to be used for engaging at the container and for retaining the container at least during transport with the carrier the container having a lower region and an upper head region during transport, the retaining means being configured for engaging at the head region of the container and arranged such that the container, when transported, is supported in the retaining means at the head region and suspended downwards from the retaining means, the base being provided with a base plate, and one of the base, the retaining means, or a combination thereof has arranged thereon at least one positioning element projecting from the one of the base, the retaining means, or combination thereof for aligning the carrier on the conveyor path and/or for supporting the carrier such that the carrier will not tilt, wherein when seen in the conveying direction, the base plate comprises trailing and leading, identical but inverse contour portions, and that, for placing the base plate on the conveyor surface in at least one predetermined orientation with respect to either the inner and outer sides of the conveyor path and/or the conveying direction, the contour portions are adapted to be brought into positive engagement with complementary contour portions of base plates of carriers present on the conveyor surface directly behind or in front of the first-mentioned base plate, the positive engagement being effective transversely to the conveying direction, and wherein for the purpose of allowing the carriers to rotate relative to one another in curves of the conveyor path, the contour portions on the base plate are arcuate and alternately concave and convex.

13. A carrier for transporting at least one container along a conveyor path, comprising a base for placing the carrier on a conveyor surface of the conveyor path, at least one retaining means which is adapted to be used for engaging at the container and for retaining the container at least during transport with the carrier the container having a lower region and an upper head region during transport, the retaining means being configured for engaging at the head region of the container and arranged such that the container, when transported, is supported in the retaining means at the head region and suspended downwards from the retaining means, the base being provided with a base plate, and one of the base, the retaining means, or a combination thereof has arranged thereon at least one positioning element projecting from the one of the base, the retaining means, or combination thereof for aligning the carrier on the conveyor path and/or for supporting the carrier such that the carrier will not tilt, wherein when seen in the conveying direction, the base plate comprises trailing and leading, identical but inverse contour portions, and that, for placing the base plate on the conveyor surface in at least one predetermined orientation with respect to either the inner and outer sides of the conveyor path and/or the conveying direction, the contour portions are adapted to be brought into positive engagement with complementary contour portions of base plates of carriers present on the conveyor surface directly behind or in front of the first-mentioned base plate, the positive engagement being effective transversely to the conveying direction, wherein for the purpose of allowing the carriers to rotate relative to one another in curves of the conveyor path, the contour portions on the base plate are arcuate and alternately concave and convex, wherein the contour portions on the base plate are circular arc shaped.

14. A container treatment apparatus, comprising:
at least one container treatment station comprising a conveyor or manipulating system and a communication area; and
a carrier for transporting at least one container along a conveyor path that extends up to and through the at least one container treatment station, which is located at a side of the conveyor path, the communication area of the at least one container treatment station being in communication with the conveyor path, the conveyor or manipulating system for inserting or removing a container into or from the carrier, the carrier comprising a base for placing the carrier on a conveyor surface of the conveyor path, at least one retaining means which is adapted to be used for engaging at the container and for retaining the container at least during transport with the carrier, the container having a lower region and an upper head region during transport, the retaining means being configured for engaging at the head region of the container and arranged such that the container, when transported, is supported in the retaining means at the head region and suspended downwards from the retaining means, the base being provided with a base plate, wherein at least one of the base and the retaining means has arranged thereon at least one carrier positioning element projecting from the one of the base and the retaining means aligning the carrier on the conveyor path and/or supporting the carrier on the conveyor path, the carrier positioning element co-operating with the container conveying or manipulating system of the container treatment station such that the carrier will not tilt while a container is inserted into or removed from the carrier.

15. An apparatus according to claim 14, wherein the positioning element is arranged to be approximately horizontally or vertically oriented relative to a center axis of the head region of the container suspended in the carrier and/or of the retaining means.

16. An apparatus according to claim 14, wherein the positioning element is a pin or a pipe section.

17. An apparatus according to claim 14, wherein the retaining means is at least one approximately semicircular recess which is open on an insertion side of the carrier and which is provided in a retaining plate mounted on the support, or at least one fork mounted on the support and/or the retaining plate, or at least one gripping clamp mounted on the support and/or the retaining plate, and wherein the positioning element is aligned vertically or horizontally with a centre of the recess, the fork or the gripping clamp.

18. An apparatus according to claim 17, wherein the gripping clamp has a variable opening width or gripping areas of different widths.

19. An apparatus according to claim 14, wherein when seen in the conveying direction, the base plate comprises trailing and leading, identical but inverse contour portions, and that, for placing the base plate on the conveyor surface in at least one predetermined orientation with respect to either the inner and outer sides of the conveyor path and/or the conveying direction, the contour portions are adapted to be brought into positive engagement with complementary contour portions of base plates of carriers present on the conveyor surface directly behind or in front of the first-mentioned base plate, the positive engagement being effective transversely to the conveying direction.

20. An apparatus according to claim 19, wherein for the purpose of allowing the carriers to rotate relative to one another in curves of the conveyor path, the contour portions on the base plate are arcuate and alternately concave and convex.

21. An apparatus according to claim 20, wherein the contour portions on the base plate are circular arc shaped.

22. An apparatus according to claim 14, wherein the container is a bottle.

23. An apparatus according to claim 14, wherein the conveyor path is a conveyor belt.

24. An apparatus according to claim 14, wherein the at least one carrier positioning element comprises a first attachment end attached to and projecting from at least one of the base and the retaining means, and a second free end not attached to the base or the retaining means.

* * * * *

UNITED STATES PATENT AND TRADEMARK OFFICE
CERTIFICATE OF CORRECTION

PATENT NO. : 8,205,743 B2
APPLICATION NO. : 12/989120
DATED : June 26, 2012
INVENTOR(S) : Meinzinger et al.

It is certified that error appears in the above-identified patent and that said Letters Patent is hereby corrected as shown below:

On the Title Page, Item (73), under "Assignee", in Column 1, Line 1, delete "Neutrabling" and insert -- Neutraubling --, therefor.

On the Title Page, Item (57), under "ABSTRACT", in Column 2, Line 4, delete "during transport." and insert -- during the transport. --, therefor.

Signed and Sealed this
Thirtieth Day of September, 2014

Michelle K. Lee
*Deputy Director of the United States Patent and Trademark Office*